(12) United States Patent  (10) Patent No.: US 7,733,245 B2
Spencer  (45) Date of Patent: Jun. 8, 2010

(54) COMPRESSION SCHEME FOR INTERVAL DATA

(75) Inventor: Quentin Spencer, St. Louis, MO (US)

(73) Assignee: Aclara Power-line Systems Inc., St. Louis, MO (US)

( * ) Notice: Subject to any disclaimer, the term of this patent is extended or adjusted under 35 U.S.C. 154(b) by 9 days.

(21) Appl. No.: 12/146,154

(22) Filed: Jun. 25, 2008

(65) Prior Publication Data
US 2009/0322571 A1 Dec. 31, 2009

(51) Int. Cl.
H03M 7/00 (2006.01)

(52) U.S. Cl. .......................................... 341/50; 341/51

(58) Field of Classification Search .................. 341/50, 341/51; 375/240.23; 382/233
See application file for complete search history.

(56) References Cited

U.S. PATENT DOCUMENTS 6,735,254 B2 * 5/2004 Thyagarajan .......... 375/240.23

2003/0039396 A1 * 2/2003 Irvine et al. ................. 382/233

* cited by examiner

Primary Examiner—Jean B Jeanglaude
(74) Attorney, Agent, or Firm—Polster, Lieder, Woodruff & Lucchesi, LC (57) ABSTRACT

A method of data compression for use in a data communication's system for an electrical utility or the like to affect the most efficient transfer of data. The data is first formed into a forming a block (B). A parameter (M) is selected from among a group of parameters. Each data value in the block is divided by the selected parameter to produce, for each data value, a quotient ($q=\lfloor n/M \rfloor$) and a remainder ($r=n-qM$). The quotient of each data value is encoded using unary coding in which the value for the quotient is encoded by transmitting an appropriate number of zeroes followed by a one. The remainder of each data value is encoded using binary encoding, and the resultant encoded block of data is then transmitted. The data values comprising the block of data are positive integer values and the encoding employs a Golomb-Rice code defined by a positive integer parameter.

12 Claims, 5 Drawing Sheets

—— APRIL (λ=11728)
------ JULY (λ=10260)

COMPRESSION SCHEME FOR INTERVAL DATA

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

This invention relates to the transmission of electric power consumption data in a "smart metering" system; and more particularly, to a data compression method for reducing the amount of data to be transmitted.

Current trends in the advanced metering infrastructure (AMI) market suggest that, for the foreseeable future, increases in the data capacity of a utility communications system used for automated metering will be useful to electric utilities. A significant amount of research has been done to extend the data throughput of AMI systems, but one area that remains relatively unexplored is data compression. Compressing interval data by any significant amount could enable an AMI system to support various combinations of more meters, more frequent intervals, or higher resolution interval data. The method of data compression proposed herein is based upon an analysis of interval data from meters, and various data compression schemes.

BRIEF SUMMARY OF THE INVENTION

The present disclosure is directed to a method of increasing the efficiency in acquiring energy consumption data from an electric meter or the like. Currently available data suggest energy consumption over fixed intervals of any length follows an exponential probability distribution. The theoretical limit (entropy bound) on compression for this type of data is in the range of 2.5-3.0 bits per value. A simple compression scheme can obtain results close to the theoretical limit by selecting the correct design parameter. Finding the optimal design parameter can be computationally complex, but it is possible to choose a good sub-optimal design parameter with lower complexity. Therefore, there is a trade-off between such considerations as: a) the degree of compression obtainable; b) response time; and, c) minimization of power consumption as a function of the number of meters from which information is sought.

Because the values are exponentially distributed, with a parameter chosen according to the method, a Golomb-Rice code can be employed and compress values to a size approaching the entropy bound for individual values. The method further utilizes pre-conditioning of data to remove mean values and further improve performance so as to approach the group entropy bound. The method also employs variable parameter encoding for this purpose.

The method is usable both with a communications scheme such is incorporated in TWACS as well as in other communication schemes involving, for example, rf.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Table 1 is a table listing nominal bits, entropy and their difference computed from the exponential fit to the probability distributions for varying resolutions and time intervals.

Table 2 is a table listing nominal bits, entropy and their difference per value of block coding over 8-hour periods, and the gain in bits per value achievable by block based coding.

Table 3 sets forth a unary coding example.

Table 4 sets forth a truncated binary coding example.

Table 5 sets forth examples of Golomb-Rice coding; and.

Table 6 is a table showing bits saved using truncation of leading zeroes for blocks of data.

Corresponding reference characters indicate corresponding parts throughout the several views of the drawings.

Corresponding reference characters indicate corresponding parts throughout the several views of the drawings.

DETAILED DESCRIPTION OF INVENTION

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Figure 1:
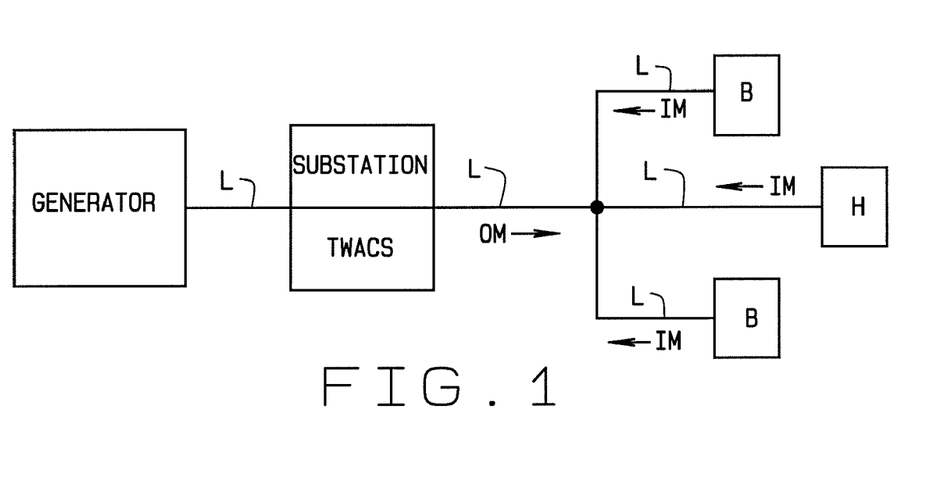
FIG. 1 is a simplified representation of an electrical distribution system employing a TWACS.

Referring to FIG. 1, an electrical power distribution system 10 generates electricity transmitted over power lines L through substations S to homes H or businesses B. Each facility (home or business) employs a meter which measures energy consumption at the premises. A TWACS provides a two-way communications system by which outbound messages OM are sent from a utility over the power line to individual meters to elicit information about energy consumption at that location. This message is received and processed at a meter. In response to queries contained in outbound messages, inbound messages IM are generated and sent back over the power line to the utility with the requested information. The messages are comprised of bits of data, and as more capability is built into meters, the more information is sought to be obtained by the utility for use in a variety of ways.

For purposes of the present invention, and in order to analyze statistics relating to typical electricity consumption data for short fixed-length intervals, a set of data was obtained from an electrical utility. The data contained both residential and commercial meters, but in the description that follows, only the residential data was used, residences representing a large majority of utility customers. It will be appreciated by those skilled in the art that power usage patterns of commercial customers differ somewhat from those of residential customers. However, it is likely that interval data from commercial meters will exhibit similar compressibility properties to that of residential data.

Two separate sets of residential data were obtained and analyzed; one set containing data from 322 different meters in April, 2007, and the second set containing data from 279 meters in July, 2007. The July data can be considered representative of typical energy consumption during the summer peak energy usage season, and the April data representative of off-season when very little heating or cooling equipment is in use. Data was sampled at intervals of 15 minutes with a resolution of 1 Watt-hour (Wh) or greater. With this resolution, it is possible to simulate data for longer intervals (30 minutes-1 hour) and lower resolutions (10 Wh or 100 Wh) using proper summing and rounding techniques.

There are two ways in which a set of interval data can contain a redundancy that can be exploited by a compression scheme. The first is if the individual data values are not uniformly distributed. When not all values are equally likely, the more likely values can be assigned shorter bit patterns while those less likely can be assigned longer bit patterns. Thus, the mean bit length will be less than if all the values required the same number of bits. The Huffman code has been shown to do this optimally for an arbitrary probability distribution.

The second type of redundancy is in correlation between successive interval values. If two values are correlated, redundant information is conveyed which is not the case if the values are coded independently of each other. This is illustrated by a fundamental inequality of information theory as described by T. M. Cover and J. A. Thomas in *Elements of Information Theory*, New York: Wiley-Interscience, 2 ed., 2006. As discussed therein, the entropy of a random variable X conditioned on Y is less than, or equal to, the entropy of X. That is, $$H(X/Y) \leq H(X) \tag{1}$$

Figure 2:
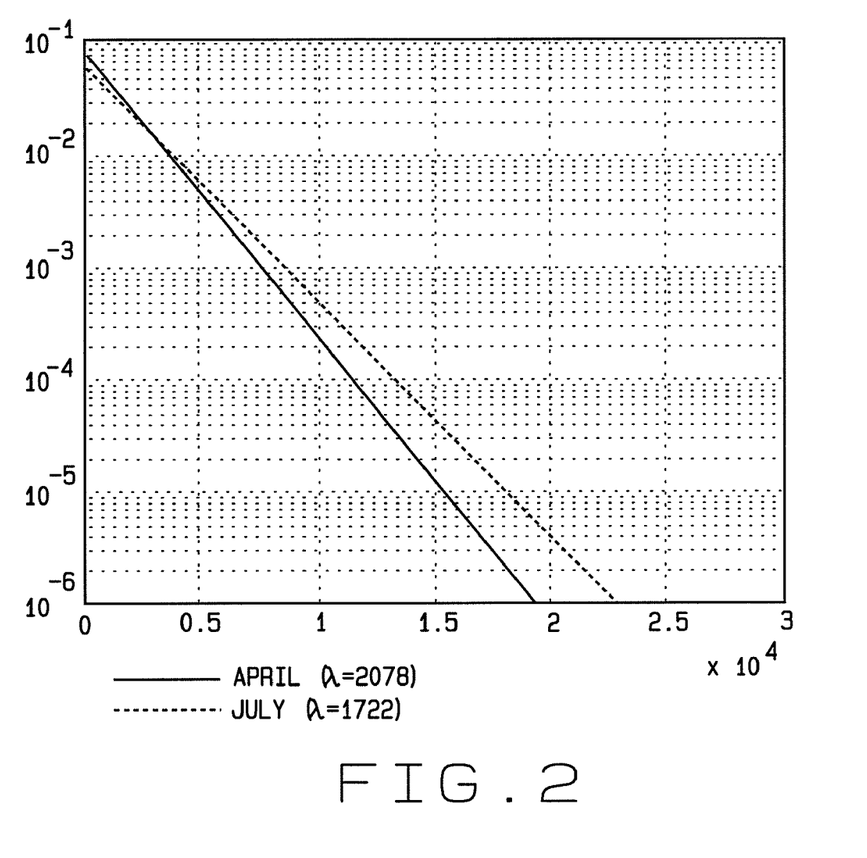
FIG. 2 is a graph illustrating the measured probability distribution of April and July 15-minute interval data with corresponding exponential fits.
Figure 3A:
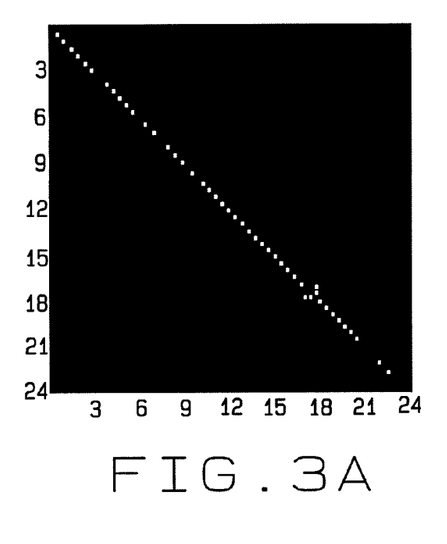
FIGS. 3A and 3B illustrate covariance for 15-minute intervals over 24 hour intervals in April (FIG. 3A) and July (FIG. 3B)
Figure 3B:
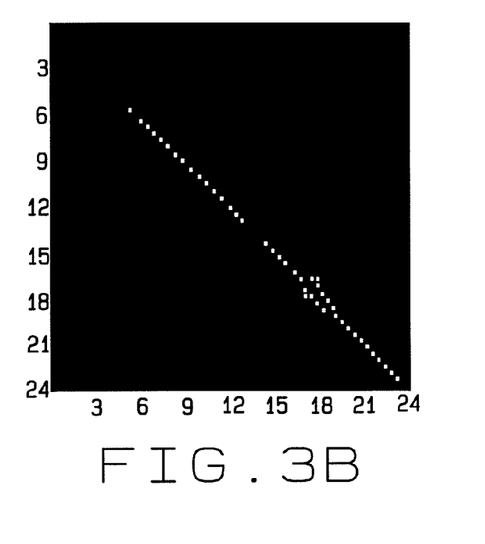

This inequality is satisfied with equality when X and Y are uncorrelated. However, any correlation implies that the entropy in X and Y together is less than the sum of their individual entropies. To evaluate entropy for the electricity consumption data, the probability distributions were of the two data sets were estimated. FIG. 2 illustrates estimated probability distributions for the April and July data, with each data point representing the probability that the energy consumed in a 15-minute will be equal to a particular integer value. As shown in FIG. 2, the distribution is not uniform; and, in fact, the linear pattern of the points on the logarithmic scale suggests an exponential distribution. Relative to a true exponential distribution, there is a slightly increased probability of small positive values than there is of zero values, but aside from this the exponential function offers a good fit to the data. The probability density of an exponential distribution is:

$$f(x) = \frac{1}{\lambda} e^{x/\lambda}.$$

Again as discussed in *Elements of Information Theory*, the distribution has a mean value of $\lambda$, and its entropy H in nats (i.e., entropy computed using the natural logarithm, rather than base-2 logarithm) is:

$$H_e(x) = \ln\lambda + 1,$$

This can be converted to entropy in bits by simply dividing by ln 2, so that:

$$H(x) = \log_2\lambda + \frac{1}{\ln 2}. \tag{2}$$

For a sample population $x_1, x_2, \ldots x_N$, the maximum likelihood estimate for the parameter $1/\lambda$ is $1/\overline{x}$, where $\overline{x}$ is the sample mean of the population. Estimating entropy then requires computing the sample mean as the estimate of $\lambda$, and applying equation (2).

Table I shows the results of computing the entropy for each combination of three interval lengths (15, 30 and 60-minute intervals), and three different resolution values (1, 10, and 100 Wh resolution) for both the April and July data sets. Table 1 includes the number of bits required to transmit data uncompressed, the entropy, and the difference between the uncompressed values and entropy. It has been found that the savings achievable using data compression is consistent across all of the various parameters, with a mean value of 2.85 bits for the April data and 2.46 bits for the July data. If compressibility of data is computed as a ratio of the entropy bound to the original size, rather than as a difference, the ratios range from about 65% to about 85% of the original size. The values that were smaller to begin with (i.e., lower resolution and smaller interval size) provide the best potential improvement with data compression.

Typical usage for residential data in the TWACS system is currently 100 Wh resolution with 60-minute intervals, and this is the data presented in the lower right hand column of Table 1 for both the April and July data. The entropy calculations show that what is currently using 10 (July) or 11 (April) bits per value could, using the method of the present invention be reduced to 7.5 (July) to 7.8 (April) bits per value. The same interval data with 10 Wh of resolution has an entropy of 11.1 (April) or 10.9 (July) bits. This implies that with an optimal compression scheme, resolution can be improved by a factor of 10 with only a slight increase in total inbound message traffic with respect to current usage patterns.

Figure 4A:
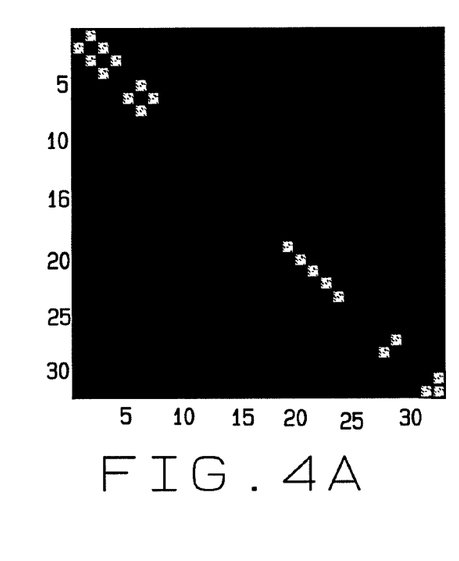
FIGS. 4A and 4B illustrate covariance over 8-hour intervals in April (FIG. 4A) and July (FIG. 4B)
Figure 4B:
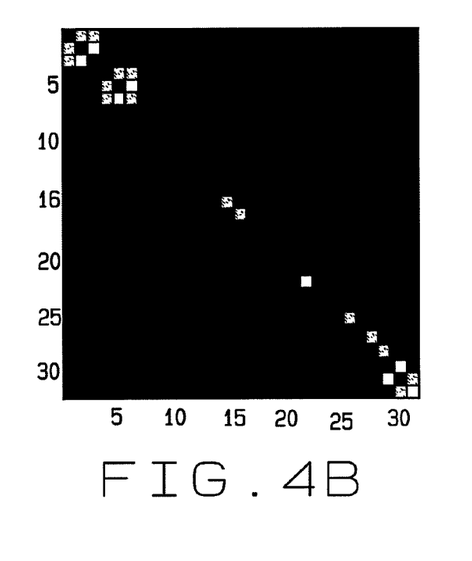

The entropy values we have estimated only represent "individual entropy", and don't take correlations between subsequent values into account. To take those correlations into account and calculate "group entropy" requires computing covariance matrices over some group of intervals. Since the current practice with meters utilizing TWACS is to transmit 60-minute interval data in blocks of 8 hours, FIGS. 4A and 4B show estimated covariance matrices over an 8-hour period for the April (FIG. 4A) and July (FIG. 4B) time frames. Other than some minor variations, the covariance matrices have a similar structure. The respective correlations are what would be expected; that is, values more closely spaced in time tend to be more highly correlated. Group entropy of the 8-hour blocks of data is estimated using the Karhunen-Loève (KL) transform. The KL transform represents data as a weighted sum of eigenvectors of a covariance matrix. If X represents the data matrix and R its covariance matrix which has eigenvectors W, then the KL transform of X is $$Y^T = X^T W$$

where the columns of W are sorted such that the mean squared values in the columns of $Y^T$ are in descending order. This transformation produces a set of values that are uncorrelated, and total entropy of the blocks is then calculated by estimating the entropy of each of the transformed values.

Figure 5A:
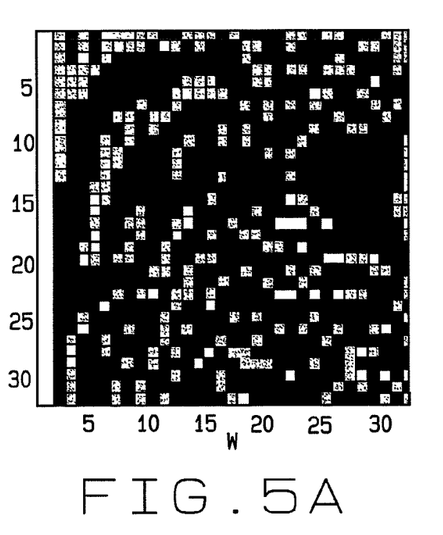
FIG. 5A illustrates eigenvectors of the covariance matrix from the July data of FIG. 4B, and FIG. 5B the basis vectors of a Discrete Cosine Transform (DCT) of size 32.
Figure 5B:
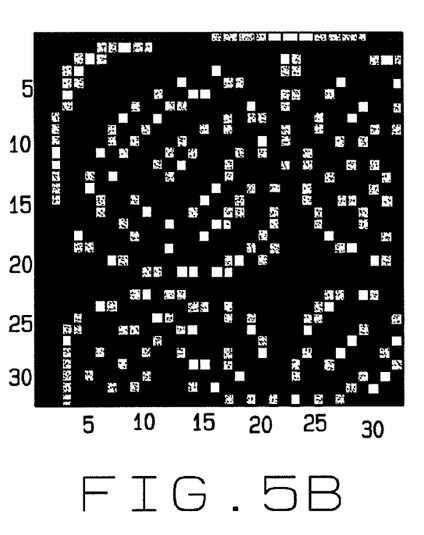
Figure 6:
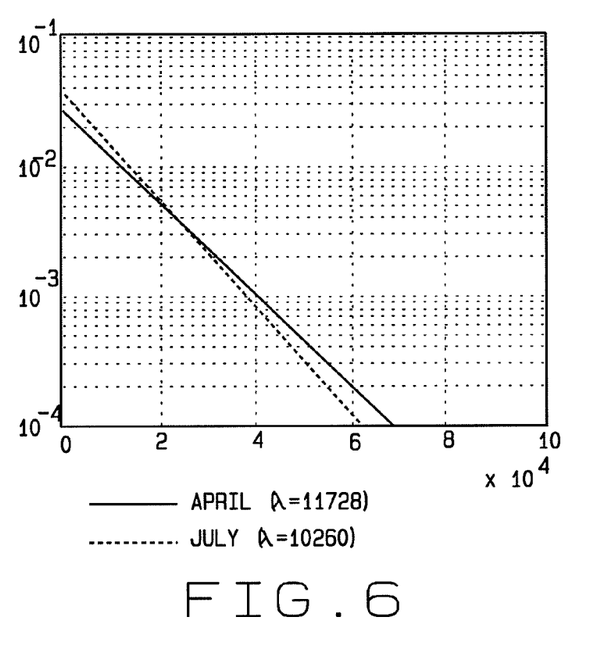
FIG. 6 is a graph showing the measured probability distribution of the measured amount of data over an 8-hour period for April and July for 15-minute intervals, a 1 Wh resolution, and corresponding exponential fit.
Figure 7:
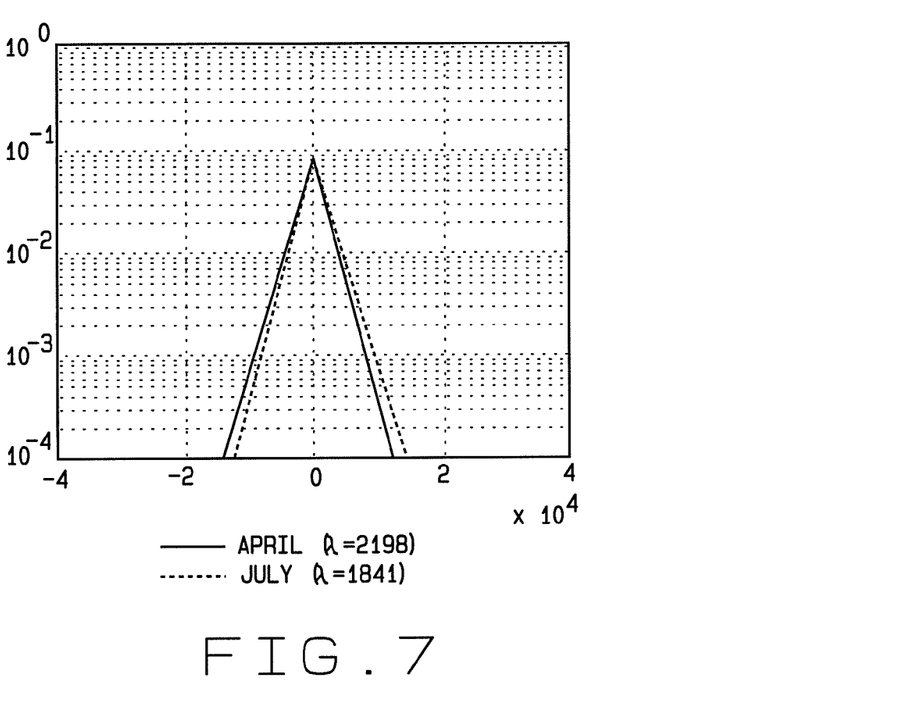
FIG. 7 is a graph showing the measured probability distribution of the second principal component of the data over an 8-hour period for April and July for 15-minute intervals, a 1 Wh resolution, and a Laplacian fit.

FIG. 5A shows eigenvectors of the covariance matrix from the July data shown in FIG. 4B. It will be noted that the first column of W in FIG. 5A contains a vector of identical values, meaning that the principal component of the data is the sum of each block. Since each of the individual samples is positive, the sum is also positive, and can be expected to have a similar probability distribution. This is as shown in FIG. 6, where the estimated probability density of the sums for the two data sets is shown with corresponding exponential distributions. Since all the remaining eigenvectors of the covariance matrix shown in FIG. 4A contain both positive and negative values, the resulting de-correlated values will not be strictly positive like the first column noted above. The probability distributions of the second principal component of the data from both data sets are shown in FIG. 7. The plot shows that in this case, the measured probability density closely matches that of a double-sided exponential (or Laplacian) distribution, which has a probability density of:

$$f(x) = \frac{1}{2\lambda} e^{-\frac{|x-\mu|}{\lambda}} \quad (3)$$

where μ is the mean (zero in this instance). The entropy of this distribution is:

$$H(x) = \log_2(2\lambda) + \frac{1}{\ln 2} \quad (4)$$

$$= \log_2(\lambda) + 1 + \frac{1}{\ln 2}. \quad (5)$$

It will be noted that the entropy of this distribution is one bit more than the entropy of a single-sided exponential distribution as set forth in equation (2). This can be expected since a value taken from a zero-mean Laplacian distribution can be encoded as a value from an exponential distribution plus a sign bit.

Figure 8:
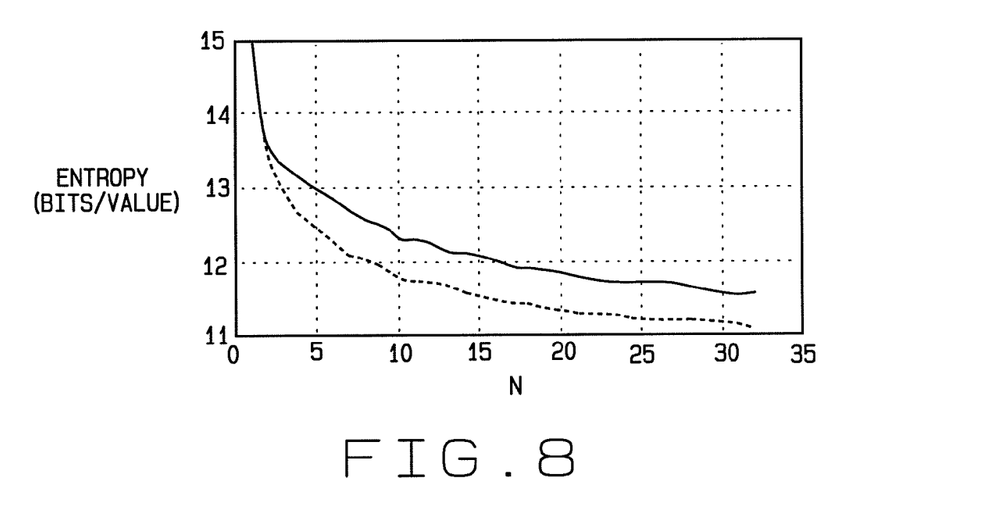
FIG. 8 is a chart of the entropy associated with each eigenvector of the covariance matrices in FIG. 4A.

A similar analysis of all of the components of the KL transform of the data showed that all of the subsequent values also had Laplacian distributions. With that information, the entropy of each of the components was computed, and the results from the two data sets are shown in FIG. 8. Here it will be noted that although the first component corresponding to the sum of the values does not require a sign bit, it still has a significantly higher entropy than all of the other components.

The mean group entropy per value for 8-hour blocks of data from the two data sets is presented in Table 2, together with the nominal number of bits required to transmit the same data without compression, and their difference. Also included in Table 2 is "block-coding gain", or the improvement in entropy due to measuring entropy across a block rather than by individual data points. The mean gains are 0.26 bits for the April data and 0.53 bits for the July data. This indicates a slightly higher level of correlation, though it is still quite limited, which may be due a higher level of regular "background" consumption from air conditioner loading.

In general, the results show that while there is some correlation in the data, it is not significant enough to result in substantial block channel coding gains. This was further corroborated by repeating the calculations for longer intervals; e.g., 12 and 24-hour blocks, which revealed that there was no significant change in the entropy bound. Because the mean of each block of data contributes heavily to the group entropy bound, much of the achievable block channel coding gain can be obtained by encoding the mean value in the data. Part of the method of this invention provides a way to accomplish this.

Among standard compression schemes that operate on individual data points, the Huffman code is has been shown to be optimal. Huffman coding is a scheme for designing a customized code for a set of symbols to be transmitted based on their relative probabilities. The basic idea is that for a finite set of symbols whose probabilities are not uniformly distributed, it is most efficient to assign short binary sequences to the most probable symbols and longer sequences to the least probable ones, so that the average sequence length is reduced. The specific details of the scheme are described in *Elements of Information Theory* previously mentioned. While a generic Huffman code would require a large lookup table that would be challenging to implement in the type of low-cost communication devices used in smart metering systems, the exponential distribution of the data to be encoded makes the implementation much simpler. As demonstrated by S. W. Golomb in "Run-length encodings," *IEEE Transactions on Information Theory*, Vol. IT-12, pp 399-401, July 1966, given a set of input data with an exponential probability distribution, the Huffman code results in a specific structure which has a relatively simple implementation. A similar scheme was proposed independently by Rice, so the resulting codes are commonly referred to as Golomb-Rice codes. A Golomb-Rice code is a compression scheme that maps positive integers to binary sequences with longer sequences for larger values and shorter sequences for smaller values. The encoding and decoding scheme is specified by a single parameter and no table lookup is required. A Golomb-Rice code is defined by a single parameter: a positive integer M. In accordance with the method of the invention, a positive integer n is encoded and then it is divided by M, giving two values: a quotient $q = \lfloor n/M \rfloor$, and a remainder $r = n - qM$. This can be thought of as dividing the positive integers into bins of a width M. The value q is transmitted using unary coding with the value q encoded as a sequence of length q+1 bits, as illustrated in Table 3. The remainder r is encoded using truncated binary coding, as illustrated in Table 4. Using truncated binary coding for a value of M=5 in Table 4, requires either $\lfloor \log_2 M \rfloor$ or $\lfloor \log_2 M \rfloor + 1$ bits. As noted in the Golomb paper, if M is selected to be an integer power of 2, implementation is particularly simple because any division can be performed by bit shifts and encoding of any remainder is no longer truncated.

Referring to Table 5, an example of Golomb-Rice coding with M=32 is shown. For M=32, the remainder will require 5 bits to encode; so, for illustration purposes, the last 5 bits representing the remainder portion of an encoded sequence are separated from the q portion by a space. In Table 5, the total number of bits for the three different values is shown.

Using the Golomb-Rice coding scheme with parameter M, the number of bits required to encode n=0 is 1 bit to encode q=0, and $\lfloor \log_2 M \rfloor$ bits to encode r, for a total of $\lfloor \log_2 M \rfloor + 1$ bits. To encode n=M, q is equal to 1, which requires 2 bits, for a total of $\lfloor \log_2 M \rfloor + 2$. Accordingly, as n increases, the number of bits required to encode n is a stepwise linear function that increases with a slope of 1/M.

The optimal parameter M for a Golomb-Rice code is determined by observing that the definition of entropy is the sum of the number of bits necessary to represent each value in a probability distribution, weighted by the probabilities of each value. That is:

$$H(x) = -\sum_n p(x=n)\log_2 p(x=n),$$

So that the number of bits needed to encode n is $-\log_2 p(x=n)$. If $$p(x=n) = \frac{1}{\lambda} e^{-n/\lambda},$$

then the number of bits N is:

$$N = \log_2\left(\frac{1}{\lambda} e^{-n/\lambda}\right) \quad (6)$$

$$= \frac{-\ln(1/\lambda) + n/\lambda}{\ln 2} \quad (7)$$

$$= \log_2 \lambda + \frac{2}{\lambda \ln 2}. \quad (8)$$

An optimal source code will therefore use $\log_2 \lambda$ bits to encode a value of 0. Then, for increasing values of n, the number of bits is a linearly increasing function of n with a slope of $1/(\lambda \ln 2)$. Since the Golomb-Rice code requires a number of bits that increases with a slope of 1/M, the bit requirements of the Golomb-Rice code will very closely approximate the linear function of Equation (8), if M is set as the nearest integer approximation of $\lambda \ln 2$.

Figure 9:
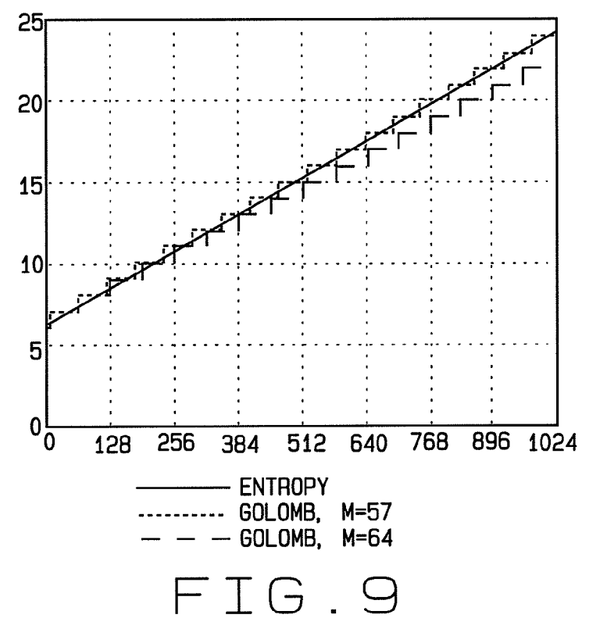
FIG. 9 is a chart of the number of bits required to transmit values of n=1 . . . 1024 for Rice-Golomb codes with M=57 and 64, with the theoretical entropy for those values when λ=82.9.

The effect of the choice of M on the number of bits required to transmit values of n from 0 to 1024 is shown in FIG. 9. Included in the plot is the entropy for each value when $\lambda$=82.9. This value is derived from the April data set for 60 minute intervals at 100 Wh resolution. The best integer approximation of $\lambda \ln 2$ is 57 which results in a very close stepwise approximation of entropy. Also included in the plot of FIG. 9 is the cost of encoding for M=64 which has lower complexity to encode and a lower cost of encoding larger values. However, the mean number of bits is increased for this particular value of $\lambda$.

All of the interval data from the two data sets were encoded at the different interval lengths and resolutions described earlier using a Golomb-Rice code with M≈$\lambda$ln 2. With this encoding, the mean savings in overall interval lengths and resolutions for the April data set was 2.83 bits, and for the July data set was 2.43 bits. For both sets of encodings, the values came within 0.03 bits of the bound predicted by entropy analysis without block source coding.

By choosing the right parameter, a Golomb-Rice code can perform close to the entropy bound for electricity consumption data because it follows an exponential distribution. However, some additional modifications will further improve performance. One such modification is the use of a variable code parameter. If a fixed parameter is used, the parameter is estimated over a very large amount of data. But, for any given subset of the data, a slightly different parameter may provide better results. Consider, for example, heavy power users whose 8-hour block of data contains many values close to maximum load. In the example in FIG. 9, their values will be close to 1024 which, while requiring only 10 bits without compression, will require over 20 bits using a Golomb-Rice code with a parameter estimated from the larger data set. If a block of data contained many values requiring 20 bits or more using the parameter of M=57, those values would require only 11 bits if M=1024. Using a variable parameter requires that the parameter be transmitted with the data, rather than setting the parameter in advance, but in many cases even with a few extra bits to transmit the parameter, the variable parameter scheme would still result in a net savings.

For simplicity, the choice of M is confined to integer powers of 2, and the selection is made from 8 different values of M by adding 3 extra bits to each block of data. Each block of data to be encoded now includes a 3-bit value encoding the M parameter, followed by the data encoded using that parameter. Instead of encoding the divisor M, we encode b which is a value from 0 to 7 representing the number of most significant bits that are encoded using unary coding. If the maximum number of bits is B, then M=$2^{B-b}$. Choosing an optimal value of b for every 8-hour block of data and encoding it results in a mean savings (overall resolutions and reporting intervals for both data sets) of 3.01 bits, compared to 2.62 bits for a fixed-parameter Golomb-Rice coding, and a group entropy bound of 3.05 bits. This now represents a block compression scheme that performs close to the entropy bound.

A way of determining the optimal parameter for an adjustable-parameter Golomb-Rice encoding, as described herein, is to make a pass over the data and count the total number of bits required bits for each possible parameter value. For the proposed scheme with 8 possible values, this represents 8 passes over the data and is relatively inefficient. However, in accordance with the method of the invention, there is an algorithm by which the best parameter can be found within a single pass over the data. To illustrate this algorithm, let the variables $x_0, x_1, \ldots x_7$ represent 8 bits to be encoded using unary coding, where $x_0$ is the least significant bit. Since the length of a unary coded value is one more than the value to be encoded, the number of bits required to encode $x_0, x_1, \ldots x_7$ with unary coding is $$c1 + \sum_{i=0}^{7} 2^i x_i$$

If a block of B values is being encoded together, let $x_{b,0}$, $x_{b,1}, \ldots x_{b,7}$ represent bits 0-7 of the $b^{th}$ value to be encoded. Then the total number of bits required to encode all B values in the block will be $$\sum_{b=i}^{B}\left(1 + \sum_{i=0}^{7} 2^i x_{b,i}\right) = B + \sum_{b=1}^{B}\sum_{i=0}^{7} 2^i x_{b,i} \quad (9)$$

$$= B + \sum_{i=0}^{7} 2^i \left(\sum_{b=1}^{B} 2^i x_{b,i}\right) \quad (10)$$

$$= B + \sum_{i=0}^{7} 2^i h_i, \quad (11)$$

with the values $h_i$ being defined as:

$$h_i = \sum_{b=1}^{B} x_{b,i}, \quad (12)$$

It will be noted that $h_i$ is a histogram representing the number of times in the block B of values such that the $i^{th}$ most significant bit is a 1, and that the histogram can be computed in a single pass over the data and then be used to find the minimum value.

If the L least significant bits are encoded using fixed length encoding, only 8-L bits will be encoded using unary coding, and this will require $$B + \sum_{i=L}^{7} 2^{i-L} h_i \quad (13)$$

bits to transmit. The remaining bits will add an additional LB bits, so the total number of bits $b_L$ required to transmit the 8 most significant bits will be:

$$b_L = (L+1)B + \sum_{t=L}^{7} 2^{i-L} h_i \quad (14)$$

$$= (L+1)B + 2^{-L}\sum_{i=L}^{7} 2^i h_i \quad (15)$$

As L increases, the terms on the left and the right increase (with the term on the left increasing linearly); so $b_L$ is a convex function of L. Therefore, to find the minimum value of $b_L$, rather than evaluating for all values of L, it is only necessary to do so for increasing values of L as long as the following inequality is satisfied:

$$b_{L+1} < b_L \quad (16)$$

$$LB + 2^{-L}\sum_{i=L}^{7} 2^i h_i < (L+1)B + 2^{-L-1}\sum_{i=L+1}^{7} 2^i h_i \quad (17)$$

$$(2^{-L} - 2^{-L-1})\sum_{i=L+1}^{7} 2^i h_i + 2^{-L} 2^L h_L < B \quad (18)$$

$$h_L + 2^{-L-1}\sum_{i=L+1}^{7} 2^i h_i < B \quad (19)$$

When this inequality is not satisfied, the number of bits saved by increasing the bin width of the Golomb-Rice code to $2^{L+1}$ is less than the number of bits added to the fixed-length portion of the code, so L should be chosen as the optimal number of bits. If the L least significant bits are encoded using fixed length encoding, only 8-L bits will be encoded using unary coding, and this will require $$B + \sum_{i=L}^{7} 2^{i-L} h_i \quad (13)$$

bits to transmit. The remaining bits will add an additional LB bits, so the total number of bits $b_L$ required to transmit the 8 most significant bits will be:

$$b_L = (L+1)B + \sum_{t=L}^{7} 2^{i-L} h_i \quad (14)$$

$$= (L+1)B + 2^{-L}\sum_{i=L}^{7} 2^i h_i \quad (15)$$

As L increases, the terms on the left and the right increase (with the term on the left increasing linearly); so $b_L$ is a convex function of L. Therefore, to find the minimum value of $b_L$, rather than evaluating for all values of L, it is only necessary to do so for increasing values of L as long as the following inequality is satisfied:

$$b_{L+1} < b_L \quad (16)$$

$$LB + 2^{-L}\sum_{i=L}^{7} 2^i h_i < (L+1)B + 2^{-L-1}\sum_{i=L+1}^{7} 2^i h_i \quad (17)$$

$$(2^{-L} - 2^{-L-1})\sum_{i=L+1}^{7} 2^i h_i + 2^{-L} 2^L h_L < B \quad (18)$$

$$h_L + 2^{-L-1}\sum_{i=L+1}^{7} 2^i h_i < B \quad (19)$$

When this inequality is not satisfied, the number of bits saved by increasing the bin width of the Golomb-Rice code to $2^{L+1}$ is less than the number of bits added to the fixed-length portion of the code, so L should be chosen as the optimal number of bits.

Based on the foregoing, the method of data compression in a communication link used for smart metering first involves forming the energy consumption values into a block of data. Next, a parameter is selected from among a group of parameters. Each data value in the block is then divided by the selected parameter to produce, for each data value, a quotient and a remainder. The quotient of each data value is encoded using unary coding where the quotient value q is encoded by transmitting q zeroes followed by a one. For example, if the quotient value is 5, then 000001 is what is transmitted for the quotient. The remainder of each data value is next encoded using standard binary encoding. After each data value comprising the block of data has been encoded in accordance with the foregoing, the resultant encoded block of data is transmitted.

Since communication devices used for smart metering must be inexpensive and have low power consumption, they are particularly limited in their computational resources, and the above fast algorithm may not always be realizable. In such instances, a near-optimal choice of L may be obtained using alternative estimation methods. One method is to set L based on the largest value in a block of data to be encoded, which we will define as $x_{max}$. If the data block is encoded using R uncompressed bits, most significant non-zero bit of $x_{max}$ is P, then we set the parameter $b=R-P+3$. This can be equivalently stated as setting the parameter M to be $2^{P-3}$. For example, if we are encoding a block of 10-bit values that are found to not use any more than 7 bits, then the 4 least significant bits are transmitted directly, and the most significant 6 bits are encoded using unary coding. Tests on the April and July data reveal that this method, while sub-optimal, is effective. With the maximum number of most significant bits for unary coding set at 2, the mean savings was 2.85 bits, which is better than the savings with a fixed parameter, but slightly less than what is achieved with optimal variable-parameter Golomb-Rice coding.

It will be understood that some electricity users tend to have constant loads that do not vary much. This results in consistently similar values for interval data when observed over longer blocks. In such instances, it is more efficient to transmit only the deviation from some standard value, rather than encode similar (and possibly large) values repeatedly. This is consistent with the observation in the KL transform analysis that the mean value of the block contains significantly more entropy than all other components. However, transmitting the mean value of a block, followed by offsets of each value from the mean, requires the addition of a sign bit to each value. A more efficient way encoding the data relative to the mean without adding sign bits is to "pre-condition" the data by finding the minimum value of the block and subtracting that value from all other values in the block. The minimum value is left unchanged, and its index in the block is transmitted separately, requiring an extra $\log_2 N$ bits for a block containing N values. If a block has values with very little variance, the result is that all values in the block, except one, are substantially smaller, and therefore require fewer bits to encode when using a variable length encoding.

In addition to the foregoing, there are other compression techniques whose performance compares well with entropy based coding. Again assuming that interval data is transmitted in blocks, and that small values are most probable, it is likely that many blocks will contain values whose most significant bits are all zeros. If a fixed number of bits are truncated from the most significant bits of each value, the number of truncated bits can be appended to the message at a relatively low cost, while significantly decreasing the total size of the message. For example, if a block of 8 10-bit values is to be transmitted, but the largest value in the block requires only 7 bits, then the three most significant bits in every value are all zeros and it is only necessary to transmit 7 bits per value. This, together with a 4-bit field that specifies the number of bits discarded. The result is that the total number of bits is 60 bits rather than 80 bits uncompressed.

The gains from using this scheme are illustrated in Table 6, which shows the resulting block length and number of bits per sample saved for 0 bits up to 4 bits truncated from each value in an 80-bit block containing 8 interval values. It will be noted that in the worst case, which occurs when at least one of the interval values has a 1 in the most significant bit, the overhead added by encoding the truncation length increases the total number of bits per value by 0.5 bits. But, the savings grows significantly if all the values in a block are small.

Figure 10:
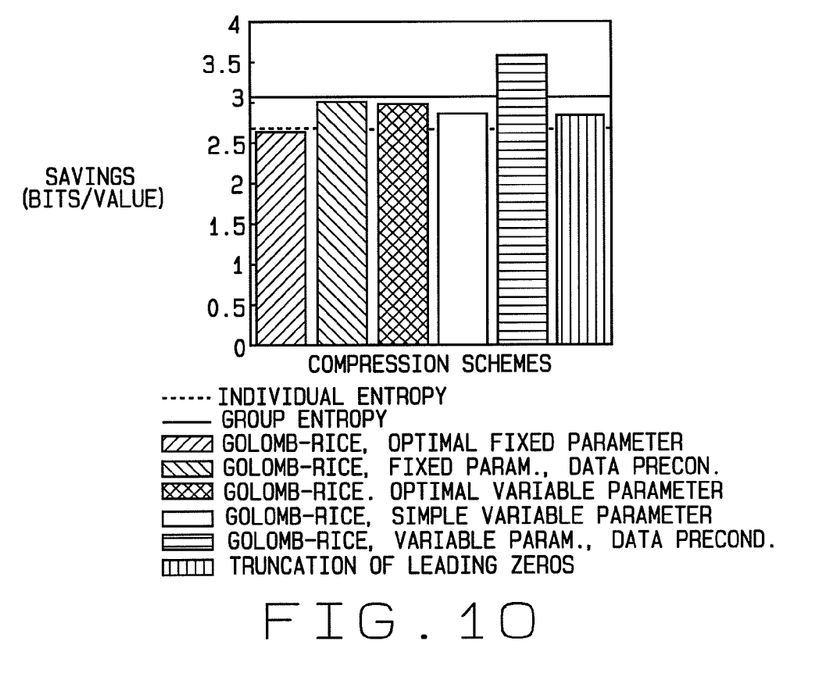
FIG. 10 is chart comparing estimated entropy and the performance of several data compression schemes, as measured in mean saved bits per interval value.

FIG. 10 compares the measured performance of the various schemes proposed in the above paragraphs relative to individual and group entropy estimates. Included in the comparison are a Golomb-Rice code with fixed parameter and two schemes of choosing a variable parameter. The comparison includes data both unmodified and preconditioned. Also included in the comparison is the truncation of leading zeros. Performance is measured as the mean number of bits per interval value saved when using a particular compression scheme on 8-hour blocks of data. The results are averaged over three different time and measurement resolution values, and the performance was quite consistent over all values of these parameters.

Based upon the information presented FIG. 10, the Golomb-Rice coding with fixed parameter achieves a performance close to the individual entropy bound. In addition, when data is preconditioned, performance is slightly less than the group entropy bound. Since preconditioning is essentially an inexpensive method of removing the mean from the data, which is shown in FIG. 8 to contain the majority of the entropy for any given block, the preconditioned data allows compression close to the group entropy bound. Both schemes for choosing a variable parameter for the Golomb-Rice code improve performance beyond the individual entropy bound with unmodified data; and, with an optimal variable parameter, the performance exceeds the group entropy bound. The reason for this is that the group entropy bound is calculated based on the combined statistics of all the data; while, the variable parameter allows the Golomb-Rice code to achieve performance approaching the entropy for an individual block of data, which may be less than the mean entropy for all users. Lastly, truncation of leading zeros performs quite well with performance between the individual and group entropy bounds.

Based In the foregoing, it has been demonstrated that from data currently available, interval consumption data tend to follow an exponential distribution, independent of interval length. This results in an entropy bound that is over 2.5 bits per value less than the nominal size, and is relatively consistent over different interval lengths and resolutions. When considering correlations between values, the entropy bound is further improved to about 3 bits. Because values are exponentially distributed, given the right parameter, the Golomb-Rice codes can compress the values to a size approaching the entropy bound for individual values, and this can be further improved by using variable-parameter encoding. Pre-conditioning data to remove the mean value will also further improve performance to that approaching the group entropy bound, and can even improve on it using variable parameter encoding. Further improvements involve the truncation of leading zeros from the data, and this has resulted in performance competitive with that of fixed-parameter Golomb-Rice coding.

In view of the above, it will be seen that the several objects and advantages of the present disclosure have been achieved and other advantageous results have been obtained.

TABLE 1

NOMINAL BITS, ENTROPY AND THEIR DIFFERENCE, COMPUTED FROM THE EXPONENTIAL FIT TO THE PROBABILITY DISTRIBUTIONS FOR VARYING RESOLUTIONS AND TIME INTERVALS.

|  | APRIL DATA | | | JULY DATA | | |  |
| --- | --- | --- | --- | --- | --- | --- | --- |
|  | 1 Wh | 10 Wh | 100 Wh | 1 Wh | 10 Wh | 100 Wh |  |
| 15-MINUTE | 15 | 12 | 9 | 15 | 11 | 8 | BITS |
| INTERVALS | 12.5 | 9.1 | 5.8 | 12.2 | 8.9 | 5.5 | ENTROPY |
|  | 2.5 | 2.9 | 3.2 | 2.8 | 2.1 | 2.5 | DIFF. |
| 30-MINUTE | 16 | 13 | 10 | 16 | 12 | 9 | BITS |
| INTERVALS | 13.5 | 10.1 | 6.8 | 13.2 | 9.9 | 6.5 | ENTROPY |
|  | 2.5 | 2.9 | 3.2 | 2.8 | 2.1 | 2.5 | DIFF. |
| 60-MINUTE | 17 | 14 | 11 | 17 | 13 | 10 | BITS |
| INTERVALS | 14.5 | 11.1 | 7.8 | 14.2 | 10.9 | 7.5 | ENTROPY |
|  | 2.5 | 2.9 | 3.2 | 2.8 | 2.1 | 2.5 | DIFF. |

TABLE 2

NOMINAL BITS, ENTROPY, AND THEIR DIFFERENCE PER VALUE FOR BLOCK CODING OVER 8-HOUR PERIODS, AND THE GAIN IN BITS PER VALUE ACHIEVABLE BY BLOCK-BASED CODING.

|  | APRIL DATA | | | JULY DATA | | |  |
| --- | --- | --- | --- | --- | --- | --- | --- |
|  | 1 Wh | 10 Wh | 100 Wh | 1 Wh | 10 Wh | 100 Wh |  |
| 15-MINUTE | 15 | 12 | 9 | 15 | 11 | 8 | BITS |
| INTERVALS | 12.3 | 8.9 | 5.6 | 11.7 | 8.4 | 5.2 | ENTROPY |
|  | 2.7 | 3.1 | 3.4 | 3.3 | 2.6 | 2.9 | DIFF. |
|  | 0.2 | 0.2 | 0.2 | 0.5 | 0.5 | 0.5 | GAIN |
| 30-MINUTE | 16 | 13 | 10 | 16 | 12 | 9 | BITS |
| INTERVALS | 13.2 | 9.9 | 6.6 | 12.6 | 9.3 | 6.0 | ENTROPY |
|  | 2.8 | 3.1 | 3.4 | 3.4 | 2.7 | 3.0 | DIFF. |
|  | 0.3 | 0.3 | 0.3 | 0.6 | 0.6 | 0.6 | GAIN |
| 60-MINUTE | 17 | 14 | 11 | 17 | 13 | 10 | BITS |
| INTERVALS | 14.2 | 10.8 | 7.5 | 13.6 | 10.3 | 7.0 | ENTROPY |
|  | 2.8 | 3.2 | 3.5 | 3.4 | 2.7 | 3.0 | DIFF. |
|  | 0.3 | 0.3 | 0.3 | 0.5 | 0.5 | 0.5 | GAIN |

TABLE 3

UNARY CODING EXAMPLE

| n | ENCODED SEQUENCE |
| --- | --- |
| 1 | 1 |
| 2 | 01 |
| 3 | 001 |
| 5 | 00001 |
| 8 | 00000001 |

TABLE 4

TRUNCATED BINARY CODING EXAMPLE FOR M = 6.

| r | ENCODED SEQUENCE |
| --- | --- |
| 0 | 00 |
| 1 | 01 |
| 2 | 100 |
| 3 | 101 |
| 4 | 110 |
| 5 | 111 |

TABLE 5

EXAMPLES OF GOLOMB-RICE CODING FOR M = 32.

| N | q | r | ENCODED SEQUENCE | NUMBER OF BITS |
| --- | --- | --- | --- | --- |
| 20 | 0 | 20 | 1 10100 | 6 |
| 245 | 7 | 21 | 00000001 10101 | 13 |
| 481 | 15 | 1 | 0000000000000001 00001 | 21 |

TABLE 6

BITS SAVED USING TRUNCATION OF LEADING ZEROS FOR BLOCKS STARTING WITH 8 10-BIT VALUES AND 4 BITS TO ENCODE THE TRUNCATION.

| BIT TRUNCATED | BLOCK LENGTH | SAVINGS (BITS/SAMPLE) |
| --- | --- | --- |
| 0 | 84 | −0.5 |
| 1 | 76 | 0.5 |
| 2 | 68 | 1.5 |
| 3 | 60 | 2.5 |
| 4 | 52 | 3.5 |

Having thus described the invention, what is claimed and desired to be secured by Letters Patent is:

1. A method of data compression for affecting the most efficient transfer of data comprising:

collecting data to be transmitted from one site to another site, and providing the data to a processor, the processor forming the data into a block of data and encoding the block of data for transmission; and, the processor, before the block of data is encoded, pre-conditioning the data by finding a minimum value of the data comprising the block and subtracting that value from all other data values in the block while leaving the minimum value of data in the block unchanged, pre-conditioning the data serving to increase data coding efficiency.

2. The method of claim 1 in which the processor encodes the data using a Golomb-Rice code.

3. The method of claim 1 in which the processor transmits the resultant encoded block of data from the one site to the other site, including separately transmitting an index value for the block of data.

4. The method of claim 3 in which the separately transmitted index is encoded using $\log_2 N$ bits for a block of data containing N data values.

5. The method of claim 1 further including the processor selecting a parameter from a group of parameters known to the receiver, dividing each pre-conditioned data value in the block by the selected parameter to produce, for each data value, a quotient and a remainder, the pre-conditioned data having positive integer values n, encoding of the data being accomplished using a code defined by a positive integer parameter M with each value n being divided by M to produce a quotient $q=\lfloor n/M \rfloor$, and a remainder $r=n-qM$; where the parameter is chosen to maximize the compression of the encoded data.

6. The method of claim 5 in which the processor encodes the quotient of each pre-conditioned data value using unary coding and the remainder of each value thereof using binary encoding.

7. The method of claim 5 in which the divisor for dividing each pre-conditioned data value is determined by the processor making a single pass over the pre-conditioned data comprising the block of data using a defined algorithm.

8. The method of claim 7 in which the algorithm is defined by computing a histogram function $h_i$ of the B data values to be encoded, where $x_{b,0}, x_{b,1}, \ldots x_{b,7}$ represent the 8 most significant bits, with $x_0$ being the least significant bit, of the $b^{th}$ value to be encoded, and $h_i$ is defined as $$h_i = \sum_{b=1}^{B} x_{b,i},$$

and is computed from the single pass over the data.

9. The method of claim 8 in which the parameter M is set to be $2^{R-8+L}$, where R is the number of bits of the uncompressed data and L is the value that minimizes the function:

$$B + \sum_{i=L}^{7} 2^{i-L} h_i,$$

which can be determined efficiently by initially setting L to zero, evaluating the quantity $$H_L = h_L + 2^{-L-1} \sum_{i=L+1}^{7} 2^i h_i,$$

incrementing L if $H_L<B$, and repeating the calculation of $H_L$ for increasing values of L, until $H_L \geq B$, and setting L to be the largest value for which $H_L<B$.

10. The method of claim 5 in which the parameter M is estimated from a block of B data values in a single pass over the pre-conditioned data by finding $x_{max}$, the largest value in the block of data, and setting M to $2^{P-3}$, where P is the location of the most significant bit of $x_{max}$ containing a logical "1".

11. A method of data compression for affecting the most efficient transfer of data comprising:

collecting data to be transmitted from one site to another site, and providing the data to a processor, the processor forming the data into a block of data and encoding the block of data for transmission; and, the processor, before the block of data is encoded, locating the maximum value $x_{max}$ in the block of data;

finding the location of the most significant bit of $x_{max}$ containing a logical "1" and, truncating a fixed number of bits from the most significant bits of all of the values in the block of data such that the most significant bit of the maximum value is a logical "1".

12. The method of claim 11 in which the processor transmits the truncated binary values, together with a value indicating the number of leading zeros truncated from each of the encoded values.

* * * * *